(12) United States Patent
Polenov et al.

(10) Patent No.: US 8,415,823 B2
(45) Date of Patent: Apr. 9, 2013

(54) VEHICLE ENERGY SUPPLY SYSTEM

(75) Inventors: Dieter Polenov, Munich (DE); Hartmut Proebstle, Augsburg (DE); Tomas Reiter, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 601 days.

(21) Appl. No.: 12/535,232

(22) Filed: Aug. 4, 2009

(65) Prior Publication Data

US 2010/0033013 A1    Feb. 11, 2010

(30) Foreign Application Priority Data

Aug. 9, 2008   (DE) .......................... 10 2008 037 242

(51) Int. Cl.
*H02G 3/00*   (2006.01)
(52) U.S. Cl.
USPC ......................................... 307/9.1; 307/10.1

(58) Field of Classification Search ................... 307/9.1, 307/10.1
See application file for complete search history.

(56) References Cited

U.S. PATENT DOCUMENTS

| | | | | |
|---|---|---|---|---|
| 5,821,634 A | * | 10/1998 | Guthrie | 307/10.7 |
| 6,384,489 B1 | * | 5/2002 | Bluemel et al. | 307/10.1 |
| 7,513,323 B2 | * | 4/2009 | Gronbach | 180/65.1 |

FOREIGN PATENT DOCUMENTS

DE    10 2007 050 228 A1    4/2009

* cited by examiner

*Primary Examiner* — Fritz M Fleming
(74) *Attorney, Agent, or Firm* — Crowell & Moring LLP

(57) ABSTRACT

A vehicle energy supply system includes a first branch of the vehicle's electrical system, a second branch of the vehicle's electrical system, and an energy transfer device that couples together the first branch of the vehicle's electrical system and the second branch of the vehicle's electrical system. The energy transfer device is designed in such a manner that energy is drawn from the alternating component of the voltage in the first branch of the vehicle's electrical system by the energy transfer device and is then fed to the second branch of the vehicle's electrical system.

19 Claims, 10 Drawing Sheets

VEHICLE ENERGY SUPPLY SYSTEM

CROSS-REFERENCE TO RELATED APPLICATION

This application which claims priority under 35 U.S.C. §119 to German Patent Application No. DE 10 2008 037 242.0, filed Aug. 9, 2008, the entire disclosure of which is herein expressly incorporated by reference.

BACKGROUND AND SUMMARY OF THE INVENTION

The invention relates to a vehicle energy supply system.

The conventional energy supply systems in motor vehicles usually comprise a generator, a (starter) battery, a plurality of consumers, and components for distributing the electric energy.

The generator feeds, as a function of the principle, a pulse-shaped current or rather a current with an alternating component into the energy supply system of the vehicle. In this context, the frequency and the amplitude of the alternating component depends, inter alia, on the direct component of the current and the design, as well as the rotational speed of the generator. A variation in voltage—the so-called generator ripple or the vehicle's electrical system ripple—is generated, as a function of the output impedance of the generator or rather the vehicle's electrical system impedance, at the terminals of the generator or rather the vehicle's electrical system. The generator ripple results in more stringent requirements on the design of specific components of the consumers or in restrictions on the connection possibilities of the consumers to the electrical system of the vehicle.

In order to feed specific consumers, such as the electric steering system, it is logical to increase its supply voltage in relation to the voltage of the vehicle's electrical system or to uncouple its feed from the vehicle's main electrical system into a dedicated branch of the vehicle's electrical system. In order to increase the supply voltage for specific consumers or in order to feed specific consumers in an uncoupled branch of the vehicle's electrical system, direct voltage transformers are usually used. Direct voltage transformers are technically complex and usually constitute an electromagnetic compatibility [EMC] risk and an enormous cost factor.

An object of the invention is to provide a vehicle energy supply system that has been improved over the prior art.

This and other objects are achieved by an energy supply system of the vehicle including a first branch of the vehicle's electrical system and a second branch of the vehicle's electrical system. The first branch of the vehicle's electrical system and the second branch of the vehicle's electrical system are coupled together by means of an energy transfer device. The energy transfer device is designed in such a manner that energy is drawn from the alternating component of the voltage in the first branch of the vehicle's electrical system by means of the energy transfer device and is then fed to the second branch of the vehicle's electrical system.

Basically the invention utilizes with simple means a spurious effect (actually noise), that is, the alternating component of the voltage in the first branch of the vehicle's electrical system, in order to supply a second branch of the vehicle's electrical system with energy, preferably on a different voltage level. In this way the goal is achieved that the alternating component of the voltage in the first branch of the vehicle's electrical system is reduced with simple means. This strategy has a positive effect on the service life of the components in the input circuits of the electrical consumers in the first branch of the vehicle's electrical system. The input sided control of the supply voltage for these consumers is simplified. The components in the input circuits of the electric consumers in the first branch of the vehicle's electrical system can be dimensioned smaller, thus producing weight and cost advantages. In addition, multi-voltage vehicle electrical systems with a freely selectable reference potential can be realized in a simple way without the use of a switching direct voltage transformer.

A further development of the invention provides that the first branch of the vehicle's electrical system comprises a first energy accumulator, a feed unit and/or a consumer.

An alternative or additional further development of the invention provides that the second branch of the vehicle's electrical system comprises a second consumer and/or a second energy accumulator.

The feed unit and/or the first consumer comprises (comprise) preferably an electric machine, by means of which the alternating component of the voltage or a voltage ripple in the first branch of the vehicle's electrical system is generated.

The energy transfer device comprises preferably a coupling unit, in particular a capacitor, by means of which the energy transfer device is coupled with respect to an alternating voltage to the first branch of the vehicle's electrical system.

The energy transfer device comprises preferably a transfer unit, in particular a transformer, by means of which the energy of the alternating component of the voltage is transferred from the first branch of the vehicle's electrical system into the second branch of the vehicle's electrical system, which exhibits, in particular, a voltage level that is different from the voltage level of the first branch of the vehicle's electrical system.

The energy transfer device comprises preferably a rectifier, which comprises, in particular, semiconductor elements, like diodes or transistors. The rectifier rectifies, in particular, the current pulses or voltage pulses that are transferred by the transfer unit.

Preferably the amplitude of the alternating component is reduced by taking the energy from the alternating component of the voltage in the first branch of the vehicle's electrical system, and, thus, the vehicle's electrical system ripple in the first branch of the vehicle's electrical system is damped.

Preferably a capacitor of the coupling unit forms with the line inductance, the primary sided inductance of the transfer unit, or an inductance L, which is connected in series with the capacitor, an LC resonant circuit, which is excited by the vehicle's electrical system ripple. Thus, the energy flow from the first branch of the vehicle's electrical system into the second branch of the vehicle's electrical system can be controlled or optimized.

The resonant frequency of the LC resonant circuit is designed so as to be variable, preferably based on a controlled change in the capacitance value of the capacitor and/or in the inductance value of the inductance.

Preferably the capacitance value of the capacitor can be varied in discrete stages by connecting or bridging individual or multiple capacitors.

The inductance value of the inductance is preferably adjustable by means of a coupled inductance and a biasing of the core material of the coupled inductance. The inductance, which is connected in series to the energy transfer device, is usually designed in an advantageous manner with a small number of turns (typically >10) on a core material. With an additional inductance (control inductance) having a higher number of turns (for example, >100 turns) on the core material, the core material can be highly biased by means of a relatively low current in the control inductance (mA range). Since the inductance is a function of the biasing (for example, in the range of the saturation limit of the core material), it is possible to adjust specifically the primary sided inductance value with the control inductance.

In order to control and regulate the energy flow, the resistors in the energy transfer device are preferably variable. The resistors can be connected in series to the capacitances, inductances as well as the transformers as discrete components in the energy transfer device. To this end, adjustable resistors and/or switchable or rather bridgeable resistors can be used in an advantageous manner.

In order to control and/or switch off the energy flow from the first branch of the vehicle's electrical system into the second branch of the vehicle's electrical system, a supply line between the energy transfer device and the first branch of the vehicle's electrical system or the second branch of the vehicle's electrical system is designed so as to be interruptable, for example, by means of a switching device. It is also possible to carry out in an advantageous manner an energy flow control or switch off process by changing the LC resonant frequency in the energy transfer device in such a manner that the resonant frequency of the energy transfer device is adjusted to a frequency range, in which there is no ripple or just a slight ripple in the vehicle's electrical system.

An especially preferred embodiment provides that several energy transfer devices are connected in parallel. In this case the capacitance value of the capacitors and/or the inductance value of the inductances is (are) adjusted by regarding a first energy transfer device as the reference system (observer system) and by adjusting the second energy transfer device in such a manner that the result is an improved energy transfer response of the second energy transfer device relative to the reference system. At this point the teaching, disclosed in the German patent application 102007050228.3, can be applied analogously. By using an energy transfer device (a path) as the reference system or the observer system, it is possible to optimize the parameters (inductance values, capacitance values, resistor values and/or the desired values for the current sources and the voltage sources) in the other paths.

A further development provides that in order to control and/or switch off the energy flow from the first branch of the vehicle's electrical system into the second branch of the vehicle's electrical system, a supply line between the energy transfer device and the first branch of the vehicle's electrical system or the second branch of the vehicle's electrical system is designed so as to be interruptable, for example, by means of a switching device.

It is provided preferably that the voltage levels of the first branch and the second branch of the vehicle's electrical system are different, so that, for example, a first branch of the vehicle's electrical system can be designed as the vehicle's high voltage electrical system, and a second branch of the vehicle's electrical system can be designed as the vehicle's low voltage electrical system.

A preferred embodiment provides that a switching element is integrated into the energy transfer device. This switching element generates by periodic switching an alternating component. It is also possible with this switching element to generate an alternating component in the energy transfer device in situations, in which there is no ripple in the vehicle's electrical system, so that this energy can be transferred from the first branch to the second branch of the vehicle's electrical system.

In addition, the first branch and the second branch of the vehicle's electrical system are energetically connected preferably by means of a DC/DC converter, in particular, a unidirectional DC/DC converter.

The second branch of the vehicle's electrical system exhibits preferably no energy accumulator. Then the electrical consumer in the second branch of the vehicle's electrical system is supplied directly, preferably with a higher voltage than in the first branch of the vehicle's electrical system.

The invention is explained in detail below by means of examples with reference to the following figures.

Other objects, advantages and novel features of the present invention will become apparent from the following detailed description of one or more preferred embodiments when considered in conjunction with the accompanying drawings.

BRIEF DESCRIPTION OF THE DRAWINGS

Identical reference numerals denote the same or corresponding components in the different figures.

DETAILED DESCRIPTION OF THE DRAWINGS

Figure 1:
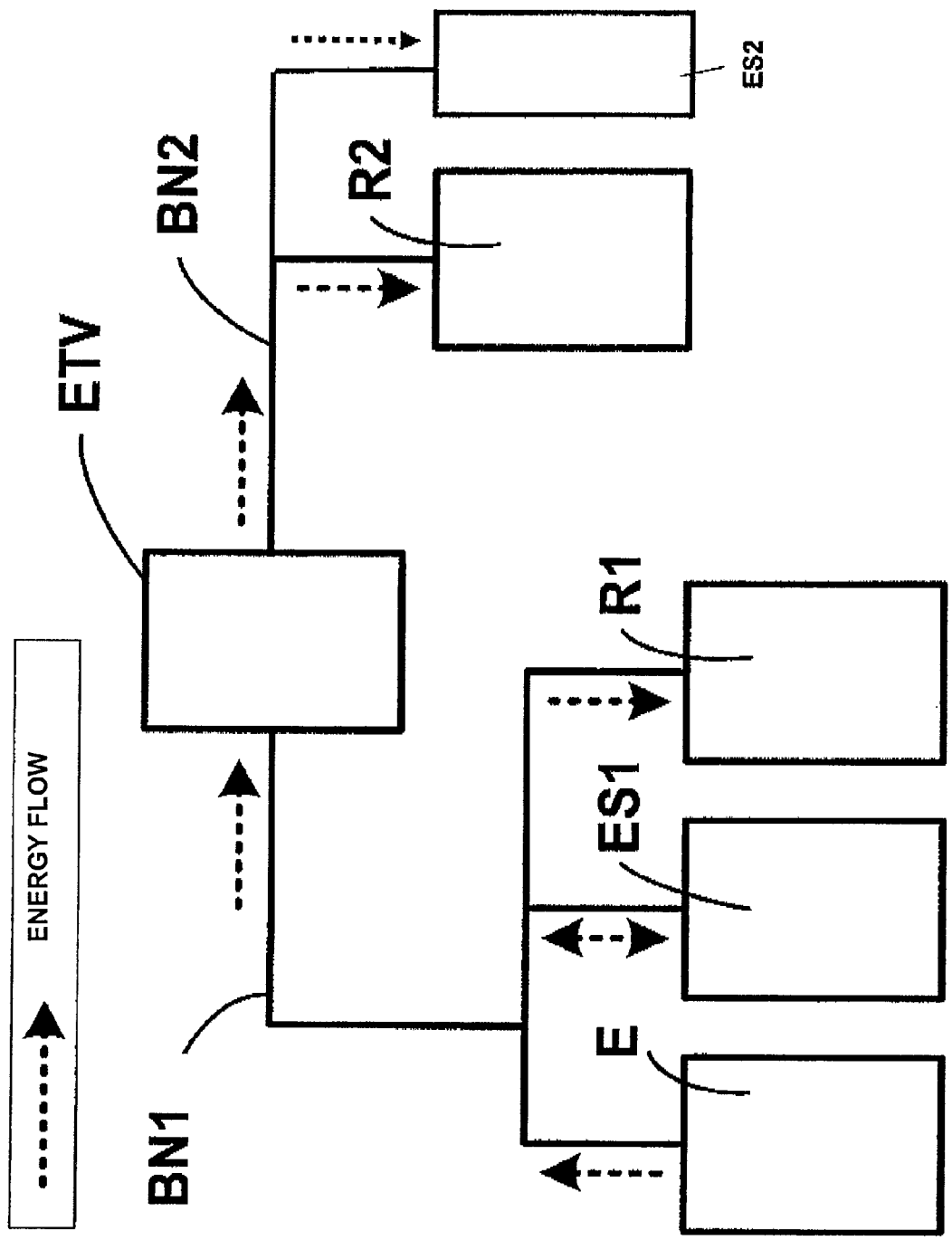
FIG. 1 shows a simplified diagram of a vehicle's energy supply system with an energy transfer device.

FIG. 1 shows a detail of a vehicle's energy supply system. It comprises a first branch of the vehicle's electrical system BN1 and at least one second branch of the vehicle's electrical system BN2. An energy transfer device ETV is used to transfer energy from the first branch of the vehicle's electrical system BN1 to the second branch of the vehicle's electrical system BN2.

The first branch of the vehicle's electrical system BN1 comprises at least one consumer R1, which is fed exclusively from the first branch of the vehicle's electrical system BN1, an electric energy accumulator ES1, like a battery, an accumulator or a capacitor, and a feed unit E, like a generator.

In this case the consumer R1 and/or the feed unit E is (are) designed as an electric machine, which generates a voltage ripple in the first branch of the vehicle's electrical system BN1.

The second branch of the vehicle's electrical system BN2 comprises at least one electric consumer R2 and/or one electric energy accumulator ES2, both of which are fed and/or charged entirely or partially from the second branch of the vehicle's electrical system BN2.

The feed unit E and the consumer R1 can be implemented by a common electric machine, which acts in a feeding manner in first times and in a consuming manner in second times.

In order to draw energy from the first branch of the vehicle's electrical system BN1 for feeding the second branch of the vehicle's electrical system BN2, the ripple or rather the voltage alternating component in the first branch of the vehicle's electrical system BN1 is used. The voltage alternating component is generated predominantly by the electric machine (as the feed unit E and/or the first electrical consumer R1). As a result, the energy content of the alternating component of the voltage in the first branch of the vehicle's electrical system BN1 is reduced.

The reference potential for the second branch of the vehicle's electrical system BN2 can be freely selected. For example, the reference potential or the plus potential of the first branch of the vehicle's electrical system BN1 can be used as the reference potential for the second branch of the vehicle's electrical system BN2.

The average energy that is fed into the second branch of the vehicle's electrical system BN2 by means of the energy transfer device ETV is greater than or equal to the energy drawn by the consumer R2 in the second branch of the vehicle's electrical system BN2. In order to increase the energy and/or the available power in the second branch of the vehicle's electrical system BN2, an additional energy accumulator ES2 can be added to the second branch of the vehicle's electrical system BN2. If in order to feed R2 from the second branch of the vehicle's electrical system BN2, less power is taken than is fed into the second branch of the vehicle's electrical system BN2 by the energy transfer device ETV, then the excess energy is stored in the energy accumulator ES2. If the consumer R2 in the second branch of the vehicle's electrical system BN2 needs more power than can be fed by the energy transfer device ETV into the second branch of the vehicle's electrical system BN2, then from ES2 the missing energy is taken from the energy accumulator ES2.

Figure 2:
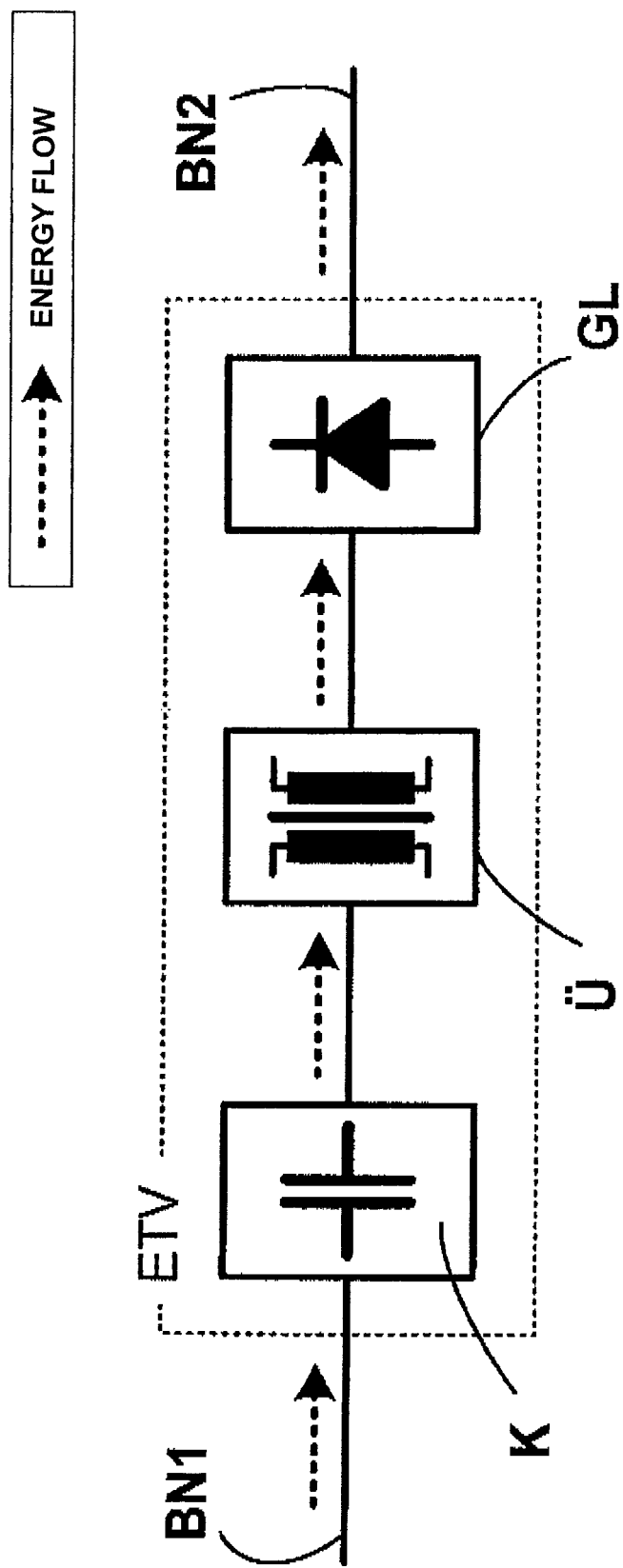
FIG. 2 shows a simplified diagram of an energy transfer device.

The energy transfer device ETV consists, as shown in the schematic drawing in FIG. 2, of at least one coupling unit K, which uncouples the alternating component of the voltage in the first branch of the vehicle's electrical system BN1, so that a transfer unit Ü is driven on the primary side with this uncoupled alternating component. At the same time the electric energy is transferred from the primary side to the secondary side of the transfer unit Ü. On the secondary side the transfer unit Ü transfers the electric energy to a rectifier GL, which feeds the second branch of the vehicle's electrical system BN2.

In an advantageous embodiment the system comprising the coupling unit K and the transfer unit Ü can be implemented in such a manner that when voltage alternating components of a certain frequency occur in the first branch of the vehicle's electrical system BN1, the energy transfer device ETV begins to resonate. Then the primary side of the transfer unit Ü is applied a voltage having an amplitude that is greater than the amplitude of the alternating component of the voltage in the first branch of the vehicle's electrical system BN1.

In the event of a predefined transformation ratio of the transfer unit Ü and a predefined amplitude of the voltage alternating component in the first branch of the vehicle's electrical system BN1, it is then possible to generate a higher voltage in the second branch of the vehicle's electrical system BN2.

An additional advantageous design provides that the resonant frequency of the coupling unit K and/or the transfer unit Ü can be influenced in such a manner that if there is a variation in the frequency of the generator ripple, the system's resonant frequency automatically tracks it and/or can track it by means of an external control and regulating device.

Figure 3:
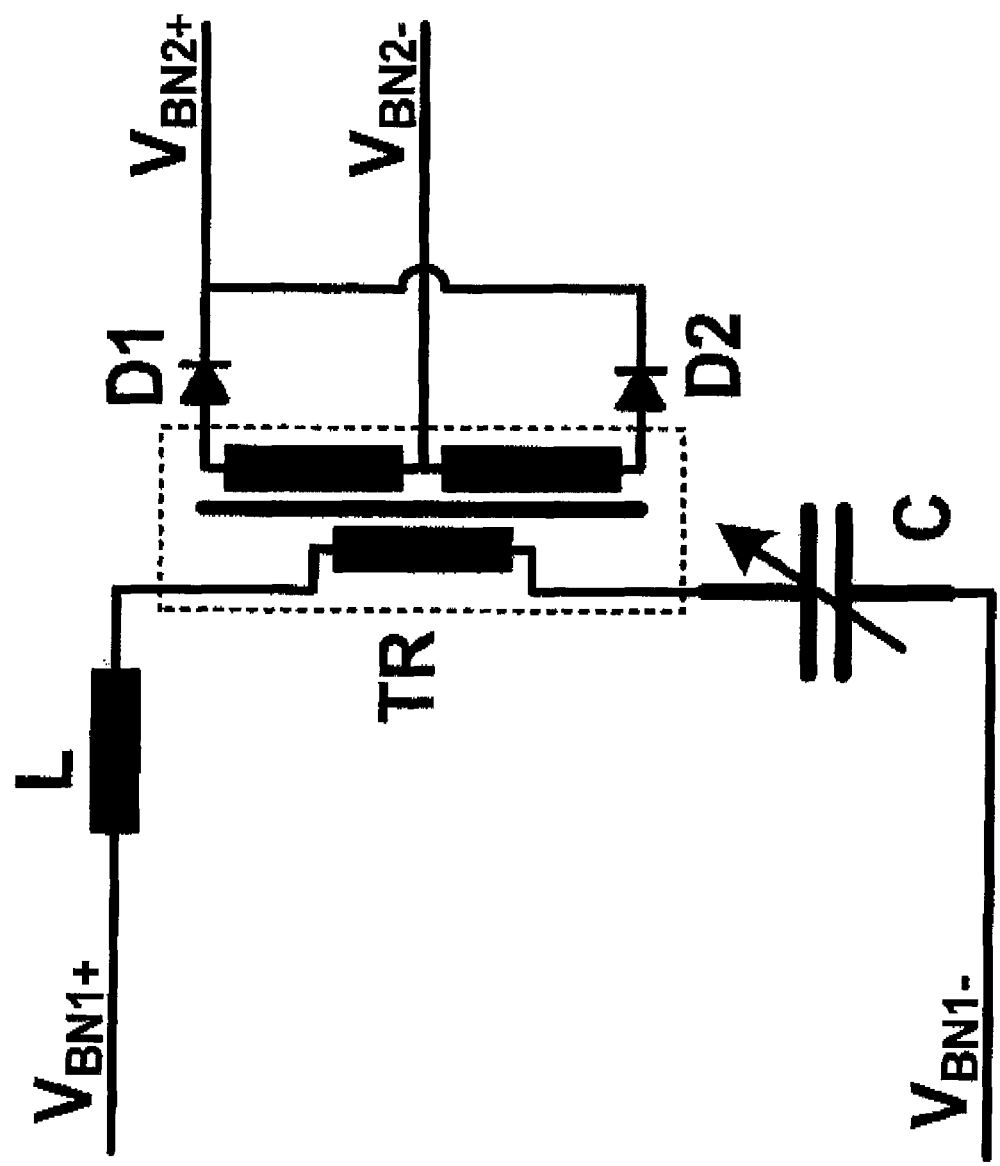
FIG. 3 shows a simplified diagram of a circuit design of an energy transfer device.

A representative circuit design of the energy transfer device ETV is shown in FIG. 3. The capacitor C assumes the function of the coupling unit, the diodes D1, D2 represent the rectifier. The transformer TR is a part of the transfer unit.

The inductance L can be realized by the inductance of the supply line, the stray inductance of the transformer TR or a dedicated component, which is provided for this purpose.

The components inductance L, capacitor C and transformer TR represent a series oscillating circuit, which can be excited by applying an alternating voltage to the terminals of the first branch of the vehicle's electrical system BN1 ($V_{BN1+}$ and $V_{BN1-}$). The resonant frequency (system's resonant frequency of the energy transfer device) of the LC oscillating circuit can be adjusted, for example, by varying the capacitance of the capacitor C or the value of the inductance L.

If a maximally desired energy availability is achieved in the second branch of the vehicle's electrical system BN2 (a state that can be detected, for example, by an increase in voltage up to a fixed upper limit in the second branch of the vehicle's electrical system BN2), the energy transfer from the first branch of the vehicle's electrical system BN1 to the second branch of the vehicle's electrical system BN2 is stopped by interrupting a supply line in the first branch of the vehicle's electrical system BN1 or in the second branch of the vehicle's electrical system BN2.

Figure 4:
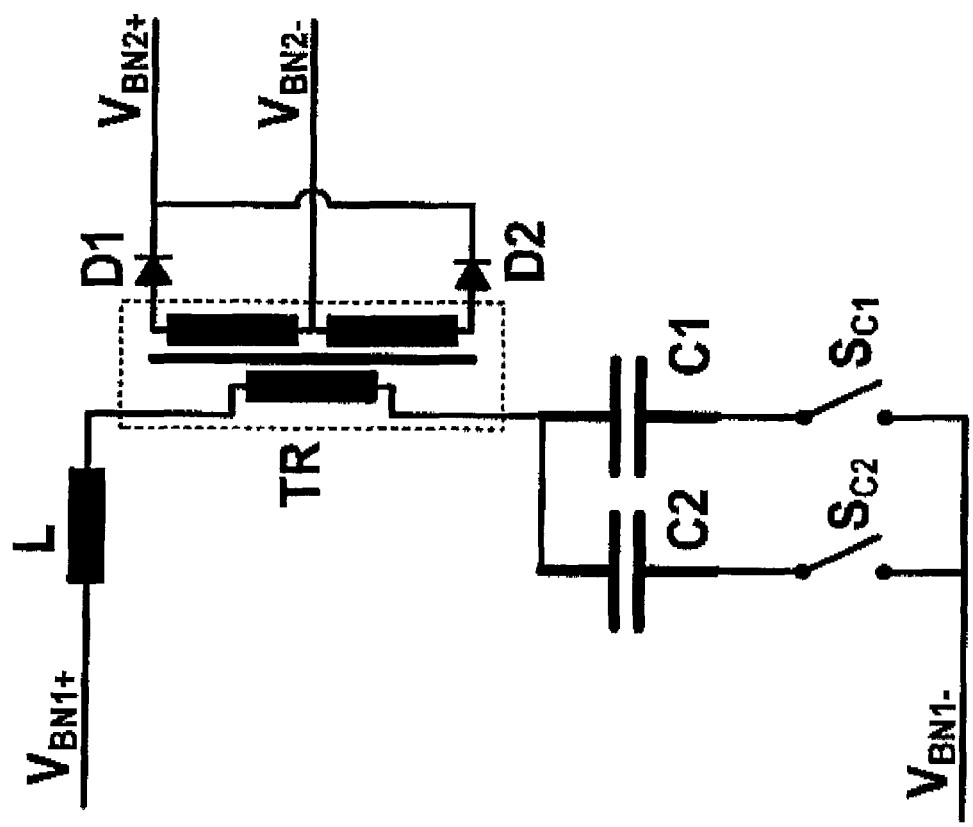
FIG. 4 shows an advantageous circuit design for changing the capacitance values in the energy transfer device.

A representative circuit design of the energy transfer device with an adjustable capacitance is shown in FIG. 4. The capacitance is realized by means of switchable capacitors C1 and C2. By suitably switching the switches $S_{c1}$ and $S_{c2}$ it is possible to adjust the four different capacitance values in this embodiment. The switches $S_{c1}$ and $S_{c2}$ can be implemented with the aid of relays or transistors.

Figure 5:
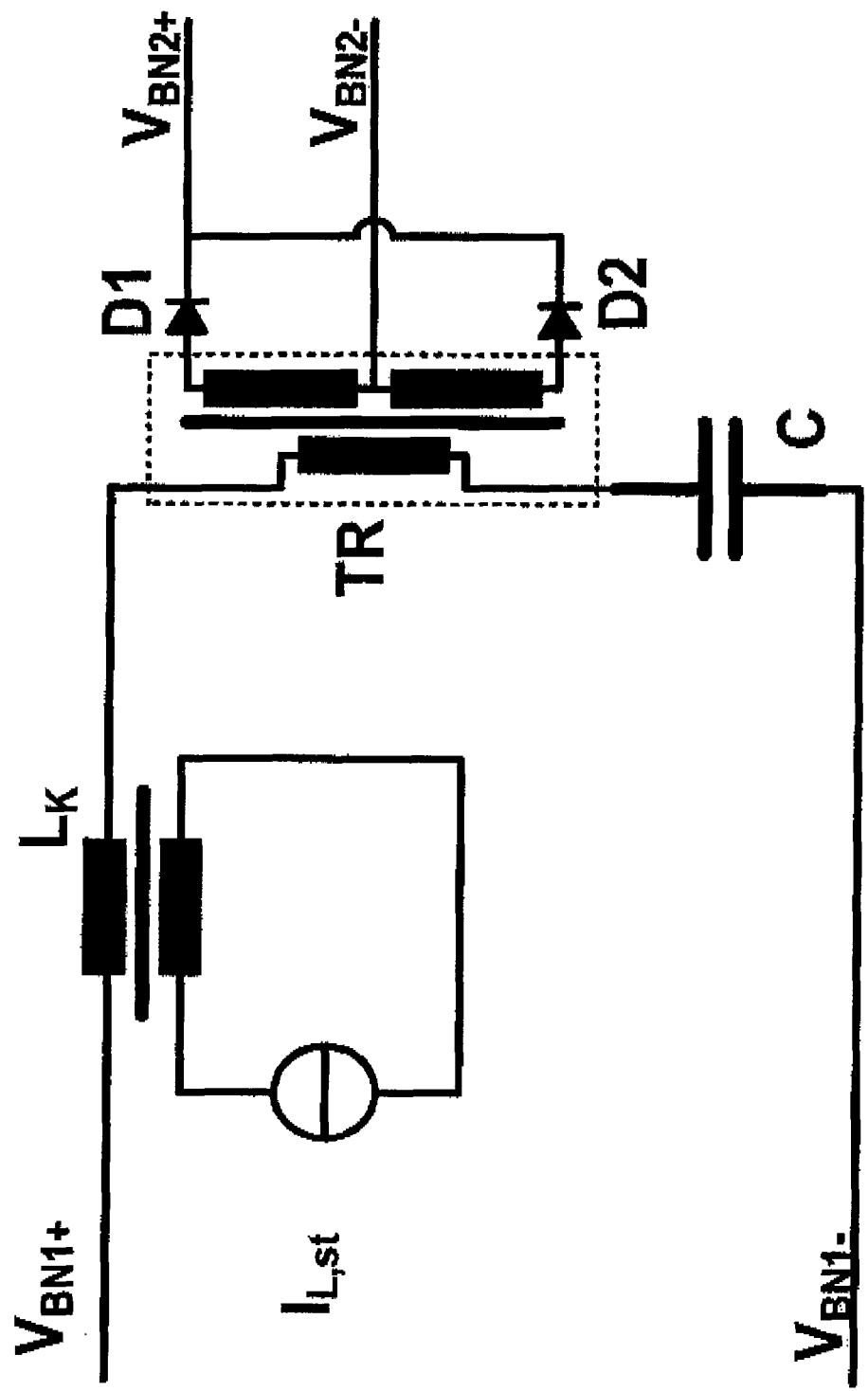
FIG. 5 shows an advantageous circuit design for changing the inductance values in the energy transfer device.

A representative circuit design of the energy transfer device with an adjustable inductance $L_K$ is shown in FIG. 5. The inductance is designed as a coupled inductance. With the aid of the controlled current source $I_{L,st}$ the inductance value can be controlled by DC biasing of the core materials of the inductance. As an alternative, the coupled inductance can also be designed so as to be integrated in the transformer.

Figure 6:
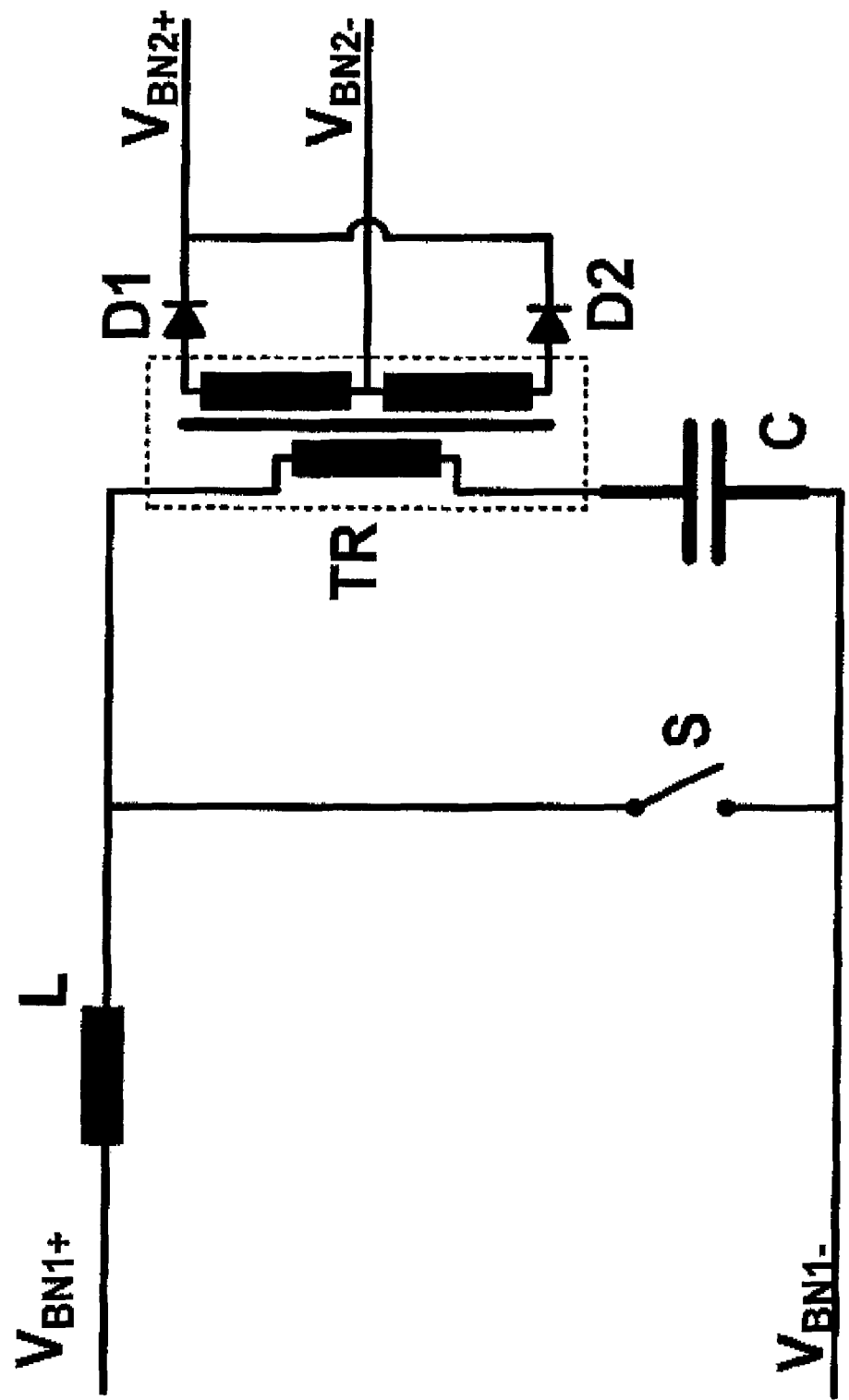
FIG. 6 shows an advantageous circuit design with an additional switching device in the energy transfer device for controlling specifically the energy flow even without a ripple in the vehicle's electrical system.

A representative circuit design of the energy transfer device for transferring the energy additionally in states without a ripple in the vehicle's electrical system is shown in FIG. 6. A switching element S, designed preferably as a transistor, is connected in parallel to the transformer TR and the capacitance C. By periodic switching of the switch S, preferably with a cycle duration that corresponds to the resonant frequency of the energy transfer device, it is also possible to transfer energy without a ripple in the vehicle's electrical system. In order to generate the "artificial" ripple, it is necessary to switch the switch S only if there is no "natural" ripple in the vehicle's electrical system. Preferably the function is activated only if it is necessary for energy availability reasons in the second branch of the vehicle's electrical system BN2, for example, for recharging an energy accumulator in the second branch of the vehicle's electrical system.

Figure 7:
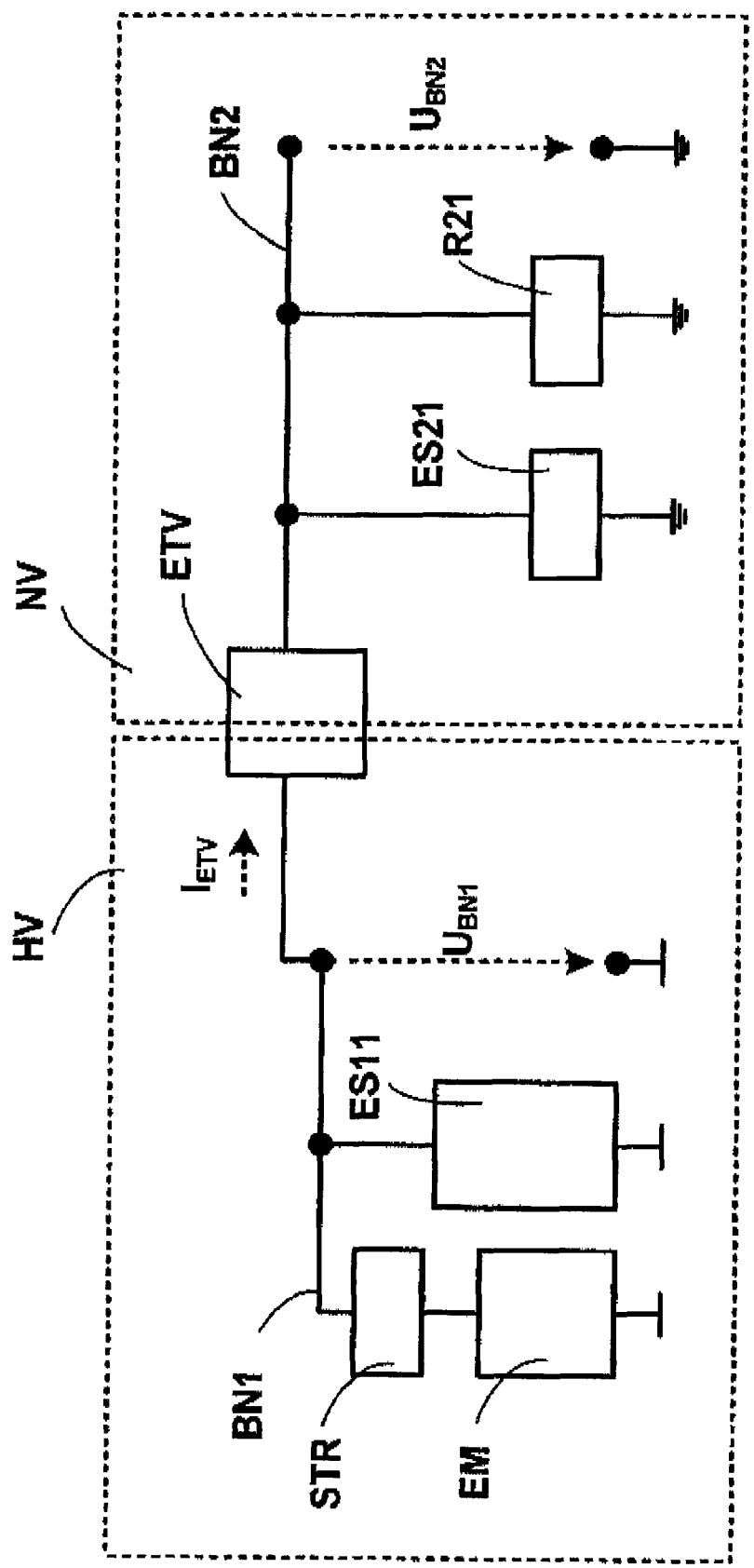
FIG. 7 shows a simplified diagram of a dual voltage vehicle electrical system in a hybrid or electric vehicle with an energy transfer device for supplying a low voltage branch of the vehicle's electrical system.

At this point an especially advantageous application of an energy transfer device ETV is explained with reference to FIG. 7. Assumed is a dual voltage vehicle electrical system in a hybrid or electric vehicle with the branches BN1 and BN2 of the vehicle's electrical system. The branch of the vehicle's electrical system BN1 relates to a high voltage side and usually comprises a high voltage energy accumulator ES11 and an electric machine EM, which is driven in a controlled manner by a current rectifier STR.

Thus, the ripple in the branch BN1 of the vehicle's electrical system is generated by the current ripple of the electric machine and/or by the pulse-shaped control in the current rectifier STR (typical frequency range 1-20 kHz). The branch BN2 of the vehicle's electrical system represents the vehicle's low voltage electrical system. It generally consists of the low voltage energy accumulator ES22 (for example, lead battery) and the low voltage consumer R21. The branch BN2 of the vehicle's electrical system can be used advantageously to supply low voltage consumers (usually voltage 12V or 24V) as a backup energy system, for example, for a redundant current supply for the vehicle's low voltage electrical system in order to supply power to a parking brake, a gear selection switch, an electric brake system, etc.

Figure 8:
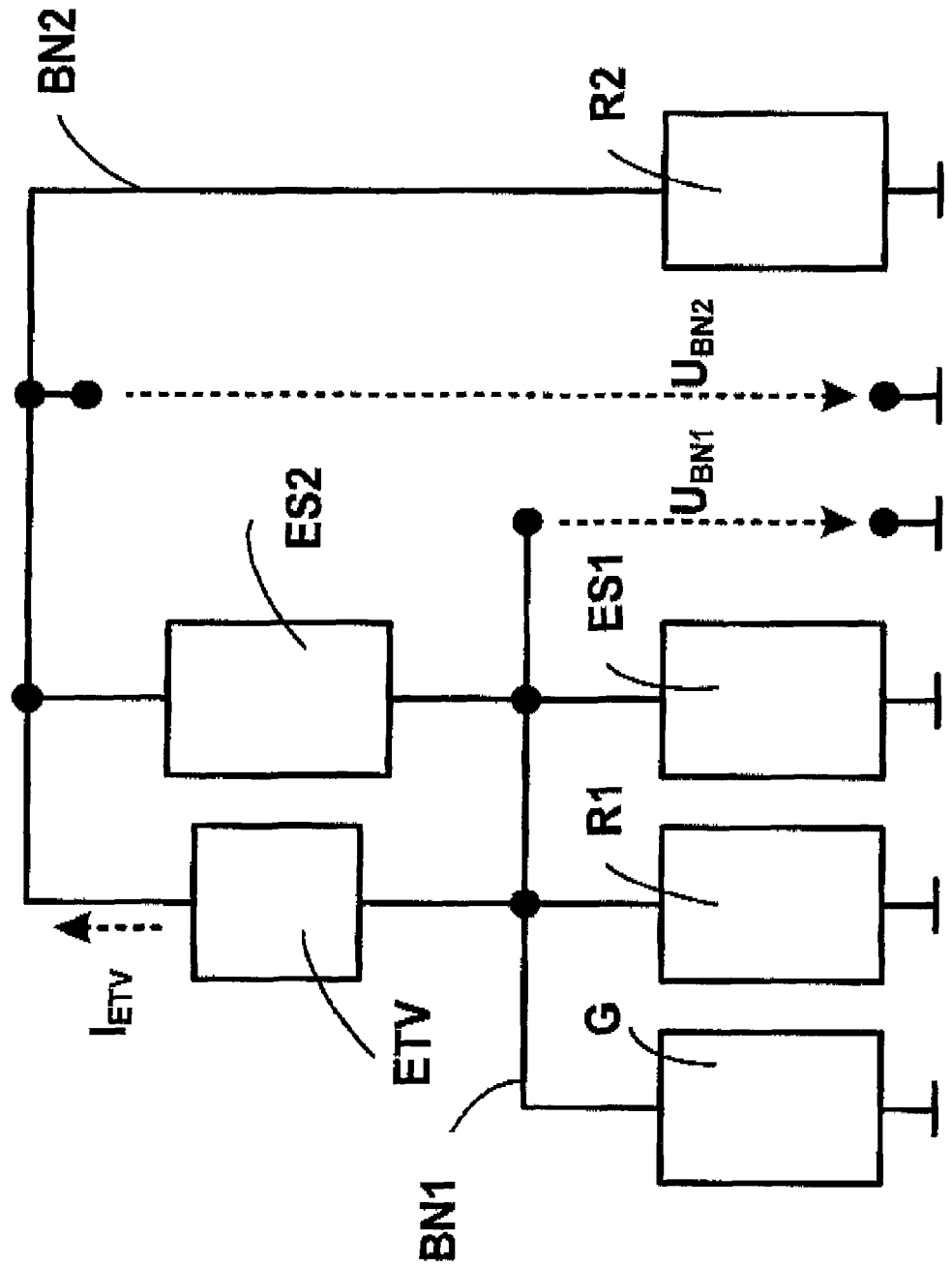
FIG. 8 shows a simplified diagram of a dual voltage vehicle electrical system for supplying transient high power consumers.

An additional advantageous application of an energy transfer device ETV is explained with reference to FIG. 8. Assumed is a dual voltage vehicle electrical system with the branches BN1 and BN2 of the vehicle's electrical system and the series connected energy accumulators ES1 and ES2 (batteries).

The first branch of the vehicle's electrical system BN1 has, in addition to the energy accumulator ES1, a consumer R1 and a feed unit, which is designed as an electric machine, in particular a generator G.

The second branch of the vehicle's electrical system BN2 feeds the consumer R2, for example, an electric steering unit. The second branch of the vehicle's electrical system BN2, especially ES2 as a part of the second branch of the vehicle's electrical system BN2, is fed by the energy transfer device ETV with energy from the first branch of the vehicle's electrical system BN1.

In this example, the advantage of the reference potential choice lies in the fact that the energy transfer device has to provide only a portion of the average power requirement of the consumer R2, since the other portion of the average power requirement is provided by the energy source ES1 and/or the generator G of the first branch of the vehicle's electrical system BN1.

Figure 9:
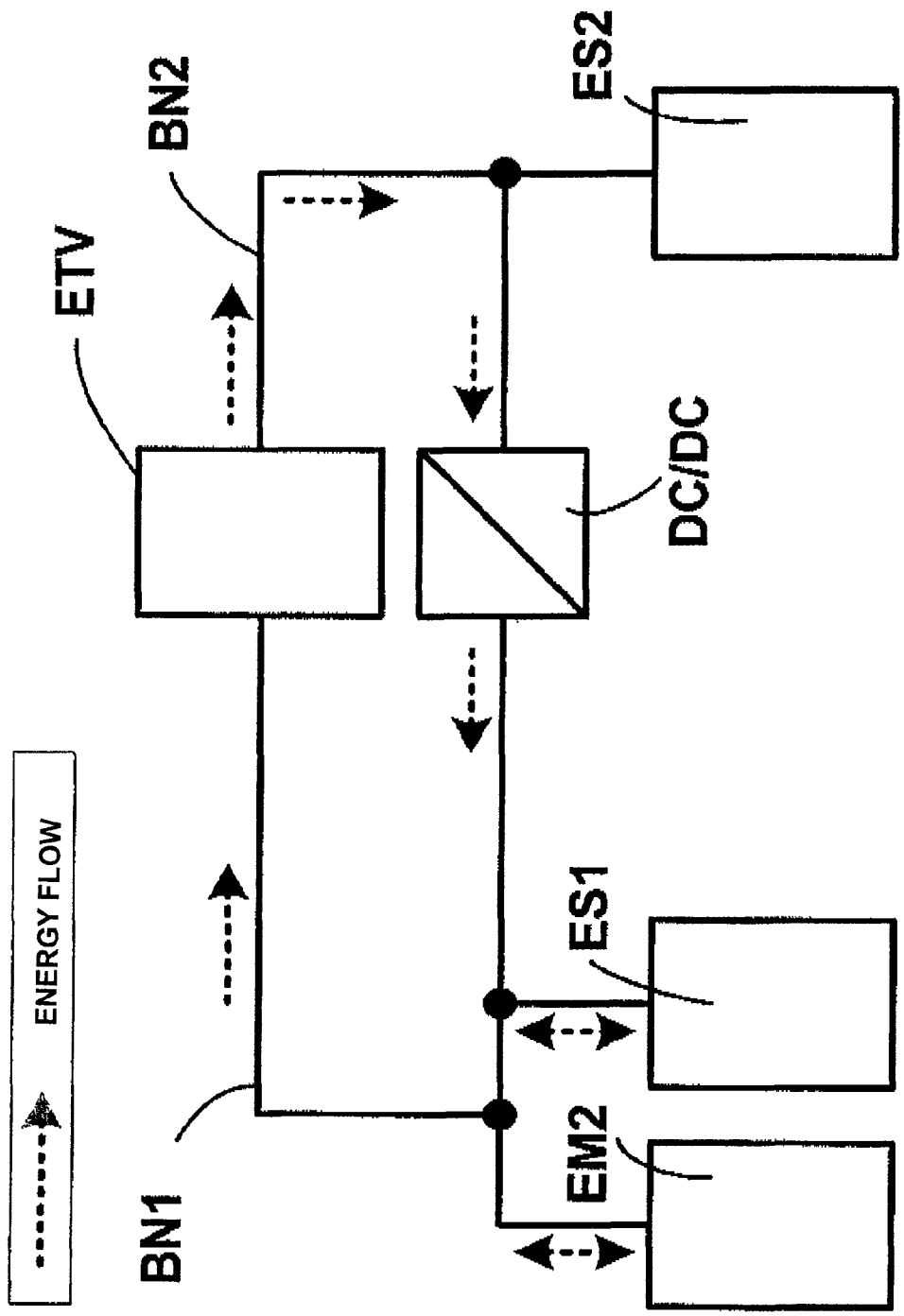
FIG. 9 shows a simplified diagram of a dual voltage vehicle electrical system for increasing the availability of power in the first branch of the vehicle's electrical system.

An additional advantageous application of an energy transfer device ETV is explained with reference to FIG. 9. The drawing shows a dual voltage vehicle electrical system with the branches BN1 and BN2 of the vehicle's electrical system and the series connected energy accumulators ES1 and ES2 (batteries or capacitive energy accumulators, like double layer capacitors). When the branch of the vehicle's electrical system BN1 exhibits a ripple in the vehicle's electrical system, energy is transferred to the branch BN2 of the vehicle's electrical system, thus reducing the ripple in the branch BN1 of the vehicle's electrical system. If the energy available in the branch BN1 of the vehicle's electrical system is low or the energy accumulator ES1 fails, then the stored energy in the energy accumulator ES2 can be transferred to the branch BN1 of the vehicle's electrical system with a DC/DC converter. Therefore, this system can be used advantageously for redundant energy supply and backup systems.

Figure 10:
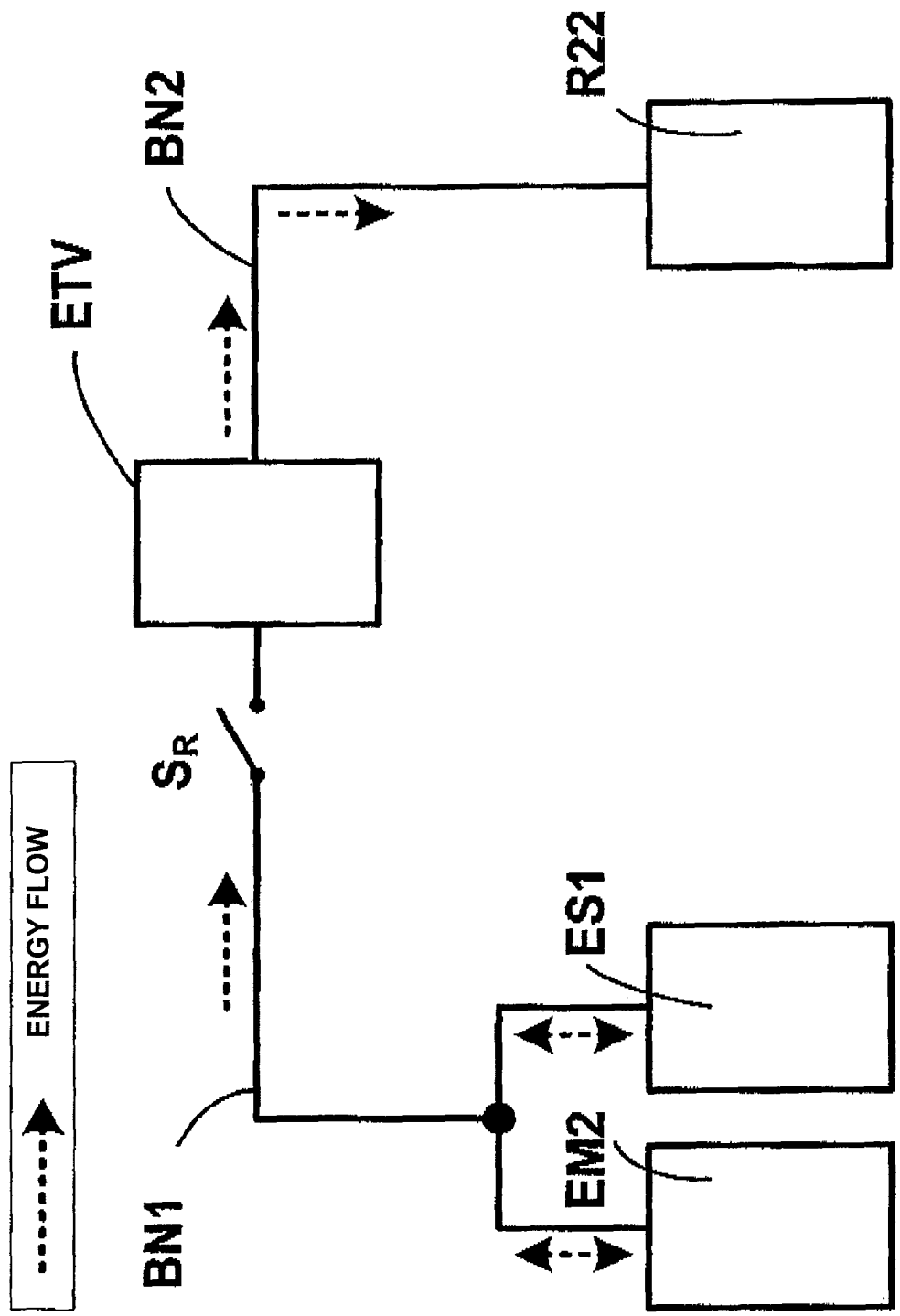
FIG. 10 shows a simplified diagram of a vehicle's electrical system with an energy transfer device for supplying consumers with higher normal voltage (for example, front windshield heater).

An advantageous application of an energy transfer device ETV for supplying consumers with higher voltage in the vehicle's electrical system is explained with reference to FIG. 10. The first branch of the vehicle's electrical system BN1 has, in addition to the energy accumulator ES1, an electric machine EM2 (generator and/or starter) and optionally additional consumers. The branch BN2 of the vehicle's electrical system has a consumer R22, such as a front windshield heater, which needs, in comparison to the voltage in the vehicle's electrical system BN1, a higher supply voltage. The energy transfer device ETV can be activated by means of the switching device SR, as a result of which the consumer R22 is supplied with energy of the ripple in BN1 of the vehicle's electrical system and, thus, simultaneously damping this ripple in the vehicle's electrical system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Vehicle energy supply system, comprising:
a first branch of a vehicle electrical system and a second branch of the vehicle electrical system, and
an energy transfer device that couples together the first branch of the vehicle electrical system and the second branch of the vehicle electrical system,
wherein energy is drawn from an alternating component of a voltage in the first branch of the vehicle electrical system by the energy transfer device, the energy is fed to the second branch of the vehicle electrical system, and the amplitude of the alternating component of the voltage in the first branch is reduced by the energy transfer device.

2. Vehicle energy supply system, as claimed in claim 1, wherein the first branch of the vehicle electrical system comprises at least one of a first energy accumulator, a feed unit, and a consumer.

3. Vehicle energy supply system, as claimed in claim 2, wherein at least one of the feed unit and the first consumer comprises an electric machine or a rectifier for an electric machine, by means of which the alternating component of the voltage or a voltage ripple in the first branch of the vehicle electrical system is generated.

4. Vehicle energy supply system, as claimed in claim 2, wherein the second branch of the vehicle electrical system comprises at least one of a second consumer and a second energy accumulator.

5. Vehicle energy supply system, as claimed in claim 2, wherein the energy transfer device comprises a coupling unit, including a capacitor, that couples the energy transfer device with respect to the alternating component of the voltage to the first branch of the vehicle electrical system.

6. Vehicle energy supply system, as claimed in claim 1, wherein the second branch of the vehicle electrical system comprises at least one of a second consumer and a second energy accumulator.

7. Vehicle energy supply system, as claimed in claim 1, wherein the energy transfer device comprises a coupling unit, including a capacitor, that couples the energy transfer device with respect to the alternating component of the voltage to the first branch of the vehicle electrical system.

8. Vehicle energy supply system, as claimed in claim 7, wherein several energy transfer devices are connected in parallel, and wherein at least one of capacitance value of the capacitors and inductance value of the inductances is adjusted by having a first energy transfer device as a reference system and by adjusting the second energy transfer device in such a manner that the result is an improved energy transfer response of the second energy transfer device relative to the reference system.

9. Vehicle energy supply system, as claimed in claim 7, wherein the capacitor of the coupling unit forms an LC resonant circuit with a line inductance, a primary sided inductance of the transfer unit, or an inductance, which is connected in series with the capacitor, wherein the LC resonant circuit is excited by the alternating component of the voltage in the first branch of the vehicle electrical system.

10. Vehicle energy supply system, as claimed in claim 9, wherein the resonant frequency of the LC resonant circuit is variable based on a controlled change in at least one of capacitance value of the capacitor and inductance value of the inductance.

11. Vehicle energy supply system, as claimed in claim 10, wherein the capacitance value of the capacitor is variable in discrete stages by connecting or bridging individual or multiple capacitors.

12. Vehicle energy supply system, as claimed in claim 10, wherein the inductance value of the inductance is adjustable based on a coupled inductance and a biasing of a core material of a coupled inductance.

13. Vehicle energy supply system, as claimed in claim 1, wherein the energy transfer device comprises a transfer unit, including a transformer, that transfers the energy of the alternating component of the voltage from the first branch of the vehicle electrical system into the second branch of the vehicle electrical system.

14. Vehicle energy supply system, as claimed in claim 13, wherein the energy transfer device comprises a rectifier that rectifies current pulses or voltage pulses transferred by the transfer unit are rectified.

15. Vehicle energy supply system, as claimed in claim 1, wherein energy flow from the first branch of the vehicle electrical system into the second branch of the vehicle electrical system is controlled by supply line between the energy transfer device and the first branch of the vehicle electrical system or the second branch of the vehicle electrical system, wherein the supply line is interruptable via a switching device.

16. Vehicle energy supply system, as claimed in claim 1, wherein a switching element is integrated into the energy transfer device, the switching element generating an alternating component by periodic switching.

17. Vehicle energy supply system, as claimed in claim 1, wherein the first and the second branches of the vehicle electrical system are energetically connected by a unidirectional DC/DC converter.

18. Vehicle energy supply system, as claimed in claim 1, wherein the second branch of the vehicle electrical system exhibits no energy accumulator, and wherein an electrical consumer in the second branch of the vehicle electrical system is supplied directly with a higher voltage than in the first branch of the vehicle electrical system.

19. A method for supplying energy in a vehicle energy supply system, comprising the acts of:
coupling, by an energy transfer device, a first branch of a vehicle electrical system and a second branch of the vehicle electrical system;
drawing energy from an alternating component of a voltage in the first branch of the vehicle electrical system by the energy transfer device;
reducing the amplitude of the alternating component of the voltage in the first branch by the energy transfer device; and
feeding the energy to the second branch of the vehicle electrical system.

* * * * *